United States Patent [19]
Kovach

[11] Patent Number: 5,152,812
[45] Date of Patent: Oct. 6, 1992

[54] RECOVERY OF CONDENSABLE ORGANIC COMPOUNDS FROM INERT GAS STREAMS LADEN

[76] Inventor: J. Louis Kovach, Worthington, Ohio 43235

[21] Appl. No.: 698,300

[22] Filed: May 10, 1991

[51] Int. Cl.$^5$ .............................................. B01D 53/04
[52] U.S. Cl. .......................................... 55/23; 55/62; 55/74; 55/80
[58] Field of Search .................... 34/27, 77, 80; 55/23, 55/28, 59, 62, 74, 80, 179, 180, 208, 267, 269, 387

[56] References Cited

U.S. PATENT DOCUMENTS

| | | | |
|---|---|---|---|
| 4,104,039 | 8/1978 | Kuri et al. | 55/23 |
| 4,285,917 | 8/1981 | Knight | 55/23 X |
| 4,414,003 | 11/1983 | Blaudszun | 55/179 X |
| 4,421,532 | 12/1983 | Sacchetti et al. | 55/62 X |
| 4,480,393 | 11/1984 | Flink et al. | 55/62 X |
| 4,522,636 | 6/1985 | Markbreiter et al. | 55/23 |
| 4,545,787 | 10/1985 | Hegarty | 55/16 |
| 4,560,394 | 12/1985 | McDonald et al. | 55/16 |
| 4,689,054 | 8/1987 | Vara et al. | 55/62 X |
| 4,738,694 | 4/1988 | Godino et al. | 55/179 X |
| 4,846,852 | 7/1989 | Schweitzer et al. | 55/180 X |
| 4,859,216 | 8/1989 | Fritsch | 55/180 X |
| 4,986,836 | 1/1991 | Tandon | 55/180 X |
| 5,035,117 | 7/1991 | Drake | 55/23 X |
| 5,037,458 | 8/1991 | Trepaud | 55/179 X |

Primary Examiner—Robert Spitzer
Attorney, Agent, or Firm—Mueller and Smith

[57] ABSTRACT

The present invention relates to an energy and equipment efficient cyclic process for the recovery of a condensable organic compound from an inert gas stream carrier. Such process comprises expansively cooling a gas in a turbine expander to effect a condensing separation and a recovery of the condensable organic compound from the relatively noncondensable inert gas component. The motive force required to pass the stream through the expander is advantageously supplied by a vacuum pump positioned after the corrosive condensables have been removed from the inert gas carrier stream. The inert gas component optionally may be passed from the vacuum pump into a compressor in order to effect its compressive heating prior to its passage into contact with the condensable organic compound to thereby effect its ladening therewith and a repetition of the cycle. Advantageously, the compressor or, alternatively, the vacuum pump, may be powered in part by the energy liberated from the expansive cooling of the organic compound-laden inert gas stream.

6 Claims, 2 Drawing Sheets

RECOVERY OF CONDENSABLE ORGANIC COMPOUNDS FROM INERT GAS STREAMS LADEN

BACKGROUND OF THE INVENTION

The widespread use of solvents in industrial applications has resulted in increased emissions of volatile organic compounds (VOCs) into the atmosphere, giving rise to environmental concerns and prompting stricter legislative controls on such emissions. As a consequence, manufacturers of pharmaceuticals, coated products, textiles, and polymer composites and foams, as well as hydrocarbon producers and distributors, face a dilemma in removing VOCs from process gas streams in that, owing to rising energy prices, recovery costs are very often higher than the value of the VOCs recovered, even in light of rising solvent prices. This dilemma has led to inquires into more profitable methods of recovering condensable organic vapors from process gas streams.

One such method is disclosed in U.S. Pat. No. 4,480,393. By first concentrating the condensable vapors contained in a process gas stream carrier and then employing refrigeration condensation to effect their recovery, the method operates more energy efficiently than those methods previously known. Particularly, this method entails first passing a process gas stream carrying a condensable organic compound such as a solvent through, for example, a packed carbon bed which adsorbs the solvent vapor such that solvent is accumulated in the bed and a solvent-free process gas stream may be exhausted or recycled back to the process. Upon becoming saturated with adsorbed solvent, the bed is regenerated by the circulation of a heated inert gas stream therethrough to vaporize the solvent. Once vaporized, the solvent is carried by the inert gas stream from the bed to a refrigeration/condensation recovery system. Therein, the vapor-laden inert gas stream is first compressed and then passed through a turbine expander to thereby effect an expansive cooling at pressures near atmospheric to temperatures generally well below the boiling points of the solvents to be recovered. Separation of the condensable solvent vapors from the relatively non-condensable inert gas stream carrier may then be effected with the recycling of recovered solvent back to the process and the recycling of inert gas back to the packed bed to continue its regeneration.

As mentioned, this method advantageously operates more energy efficiently than methods previously known. By using a turbine expander coupled to a compressor to effect the expansive cooling of the solvent-containing inert gas stream effluent from the packed carbon bed regeneration, the energy liberated from the cooling of the gas stream in the expander can be used to drive the compressor. The compressor effects in the gas stream a pressurization that results in a better solvent condensation for a given operating temperature. In addition, an energy exchange can be effected between the hot solvent-containing inert gas stream effluent from the bed and the cooled inert gas stream recycled from the condensation separation to pre-heat the inert gas entering the compressor and to pre-cool the solvent-containing inert gas entering the turbine. The net effect of the foregoing is a method which enables solvent-intensive industries to comply with governmental regulations while maintaining economically profitable operations.

Attendant with industrial acceptance of the aforementioned method for VOC recovery have come demands for its further refinement. Namely, because the compressor side of the turbine compressor-expander is employed to pressurize the solvent-laden inert gas effluent from the bed, the heat of compression thereby imparted to the stream must be extracted therefrom prior to its expansive cooling in the expander side in order that a sufficiently low refrigeration temperature may be achieved. Although some of this waste heat may be recovered and used to heat the inert gas stream being recycled back to the bed to continue regeneration, this recovery necessitates the introduction of an additional heat exchanger into the process. Moreover, because the compressed solvent-laden stream is at a relatively high pressure as compared to the expansively cooled inert gas recycle stream, the pressure differential therebetween presents problems in heat exchanger design, construction and operation. In addition, because the inert gas recycle stream may be heated insufficiently to effect solvent vaporization within the bed solely by this heat exchange or by a subsequent heat exchange with the solvent-laden inert gas effluent from the bed, a heater must often be employed to supply the additional energy needed. Inasmuch as the capital expense associated the purchase of heat exchangers, heaters and the like, especially in light of attendant operational, energy, and maintenance expenses, is often seen as an obstacle to the adoption of this process by an industry so considering, there remains a need for further improvements in the methods for recovering VOCs from process gas streams.

BROAD STATEMENT OF THE INVENTION

The present invention relates to a process for recovering a condensable organic compound from an inert gas stream laden therewith which overcomes energy and equipment inefficiencies heretofore present in the art. This has been accomplished in the instant invention by using the compressor side of the turbine compressor-expander to compressively heat the inert gas recycle stream prior to its, for example, reintroduction back into an adsorbent bed being regenerated. In contrast to using the compressor side of the turbine expander to pressurize the solvent-laden inert gas stream prior to its expansive cooling in the expander side, employing the turbine expander in the manner disclosed in the present invention eliminates both the need for cooling of the stream between the expander and the compressor and the attendant need for a heat exchanger. Moreover, since compressing the inert gas recycle stream advantageously inparts thereto energy that may be used directly to effect solvent vaporization inside the bed, the need and expense of extraneously supplied heat can likewise be eliminated. Also advantageous in the instant invention is that the motive force to transport the solvent-laden inert gas from the adsorbent bed to the expander may be located downstream of the expander by the employment of a vacuum pump. Locating the main driving component after the condensables, such as solvents and water, have been separated from the inert gas carrier means that less corrosion protection therefor is required and that less expensive materials of construction may be used. The compressor, which both compressively heats the inert gas recycle stream and provides the motive force to fill the bed therewith, may also, in the instant invention, be positioned after the condensables have been removed and may likewise be constructed of less expensive materials. Thus, when employed in the inert gas regeneration of packed adsorbent beds used to strip solvent vapors from process gas streams, the present invention advantageously decreases capital expenses and simplifies operations by eliminating process equipment, saves energy by efficiently utilizing directly the heat of compression generated by the compressor, and reduces equipment purchase and maintenance costs because the main drive components for the process are located after the corrosive condensables have been removed from the inert gas stream.

It is, therefore, a feature of the invention to provide a process for the economical and efficient recovery of condensable organic compounds from inert gas streams laden therewith. In its preferred embodiment as incorporated into the inert gas regeneration of solvent-saturated adsorbent beds, the process includes passing an inert gas stream laden with a condensable organic compound into heat exchange relationship with a cooler inert gas stream recovered from a later step of the process. The condensable solvent component of the heat exchanged stream is separated from the relatively noncondensable inert gas component, and the separated gas stream is passed by the motive force supplied by a vacuum pump positioned downstream through an expander for further cooling. Additional solvent then may be separated from the expanded stream, resulting in the formation of a regenerated inert gas stream. The regenerated gas stream, as aforementioned, is passed into heat exchange relationship with the warmer solvent-laden inert gas stream. The heated inert gas stream is passed into the vacuum pump and then into a compressor in order to effect its further heating through compression and the imparting of an additional motive force thereto. The compressor, advantageously, may be driven by the energy liberated by the expansive cooling of the solvent-laden inert gas stream. Depending on process requirements, the compressor, optionally, may be removed and the vacuum pump may be powered directly by the turbine expander. Finally, the heated inert gas stream then may be passed into contact with a condensable organic compound in, for example, an adsorbent bed saturated with solvent; thus forming the solvent-laden inert gas stream and enabling the repetition of the cycle.

These and other advantages will be readily apparent to those skilled in the art based upon the disclosure contained herein.

These drawings will be described in detail in connection with the Detailed Description of the Invention which follows.

DETAILED DESCRIPTION OF THE INVENTION

In the following description, the instant invention initially is described as a general method for separating and recovering a condensable organic compound from its inert gas carrier stream, (e.g. nitrogen). Then, the invention is described as incorporated into a process for the inert gas regeneration of a packed adsorbent bed used to strip solvent vapors from a process gas stream.

Figure 1:
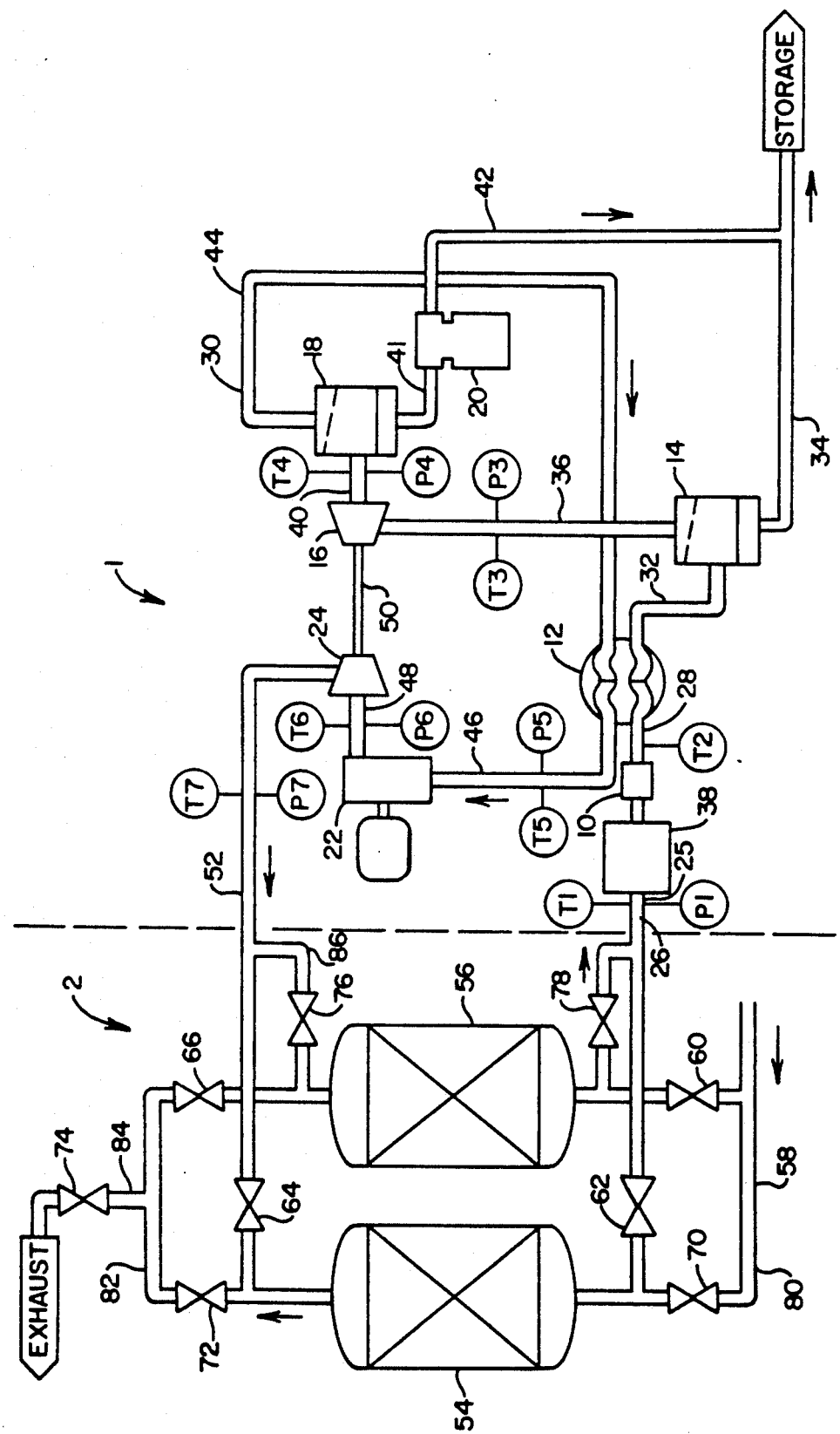
FIG. 1 is a schematic diagram of a specific configuration of the cycle for the recovery of a condensable organic compound from an inert gas stream laden therewith according to the instant invention and in connection with its application in a process for the inert gas regeneration of a packed adsorbent bed used to strip solvent vapors from a process gas stream.
Figure 2:
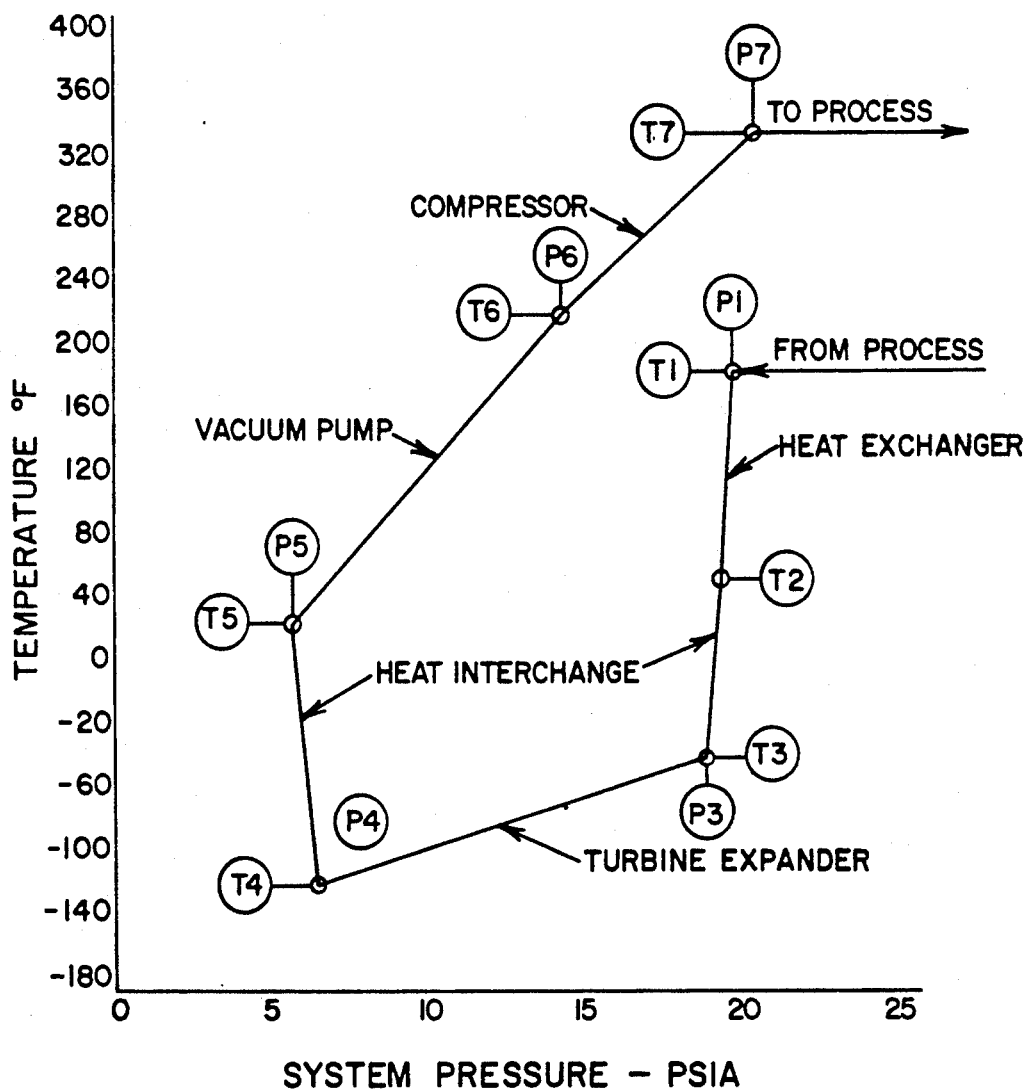
FIG. 2 is a graphical depiction of the thermohydraulics of the instant invention as shown by a representative plotting of system temperature versus system pressure.

Referring initially to FIG. 1, the inventive process is represented generally at 1 and the stripping process is represented generally at 2. The inventive process includes cooler 10, heat exchanger 12, first separator 14, turbine expander 16, second separator 18, pump 20, vacuum pump 22, and compressor 24. Referring also to FIG. 2, in practice an inert gas stream contaminated with a condensable organic compound (e.g. VOC), stream 25, enters the process via line 26, at temperature T1 and pressure P1. Depending upon whether moisture is present in the stream, contaminated stream 25 may be passed through dehumidifier 38. Similarly, depending upon temperature T1 and the characteristics of the vapor component, contaminated stream 25 may be pre-cooled in cooler 10 to temperature T2 prior to its passage into heat exchanger 12 via line 28. Advantageously, contaminated stream 25 may be cooled in heat exchanger 12 to temperature T3 by its passage in heat exchange relationship with inert gas recycle stream 30. Stream 30 has been expansively cooled to temperature T4 in turbine expander 16, as described in more detail below. Withdrawn from heat exchanger 12 via line 32, stream 25, now cooled to below the vaporization or boiling point of the organic compound being carried thereby, then enters separator 14 wherein, depending upon the temperature and pressure of stream 25 and upon the characteristics of the vapor component including its boiling point and vapor pressure, a certain portion of the organic compound is separated from the inert gas carrier, e.g. through condensation, and withdrawn via line 34 for storage or recycle.

The noncondensed balance of stream 25, including the inert gas carrier and the remainder of the organic compound, is withdrawn from separator 14 via line 36 at temperature T3 and pressure P3 and passed into expander 16, which advantageously is a turbine expander. Therein, stream 25 is expansively cooled from temperature T3 to temperature T4 upon a pressure drop from pressure P3 to pressure P4. The refrigeration of stream 25 effectuated by turbine expander 16 facilitates a more complete separation of the organic compound from its relatively noncondensable inert carrier gas upon entry of stream 25 into separator 18 via line 40. Inclusion of dehumidifier 38 in the process will ensure that any moisture present in stream 25 will not frost the equipment since operating temperatures within turbine 16 and separator 18 may be below the freezing point of water. Condensate is removed from separator 18 via line 41 and transported, e.g. by pump 20, to storage or recycle via lines 42 and 34. Advantageously, regenerated inert gas stream 30 is removed from separator 18 via line 44 and recycled back to the process from which it exited laden with an organic compound.

As previously mentioned, inasmuch as stream 25 advantageously is pre-cooled before its passage into turbine expander 16 and stream 30 is pre-heated before its introduction back into the process, an advantageous heat exchange therebetween may be effected in heat exchanger 12. Thus, stream 30 is passed into heat exchanger 12 via line 44. Withdrawn from heat exchanger 12 via line 46 at increased temperature T5 and at pressure P5, stream 30 is passed into vacuum pump 22, effecting a pressure and temperature rise to pressure P6 and temperature T6. Vacuum pump 22 is the main driving component for the process in that it supplies the motive force to "pull" solvent-laden inert gas stream 25 through turbine expander 16. Depending on process requirements, stream 30 exiting vacuum pump 22 may optionally be passed into compressor 24 via line 48 in order to effect a compressive heating from temperature T6 to temperature T7 as a consequence of pressurization from P6 to P7. Compressor 24 also imparts additional motive force to stream 30. Advantageously, compressor 24 may be coupled to turbine expander 16 through common spindle 50. When compressor 24 and expander 16 are so-coupled, the energy liberated by the expansive cooling of stream 25 is used to power the compressive heating of stream 30. Alternatively, compressor 24 may be removed and part of the energy needed to drive the vacuum pump supplied by turbine expander 16. From compressor 24 is withdrawn via line 52 regenerated and pre-heated inert gas stream 30, in condition for introduction back into its source process.

Looking again to FIG. 1 and FIG. 2, the description of the instant invention continues by specific reference to a process for the inert gas regeneration of a packed adsorbent bed used to strip solvent vapors (e.g. VOCs) from process gas streams. The stripping process represented generally at 2 typically includes at least a pair of adsorbent beds, bed 54 and bed 56, to adsorb vaporous organic compounds from process gas carrier stream 58. Such a stream may, for example, be the exhaust from an oven in which the drying of coated products liberates solvent vapors. At least two beds are needed in order to make the stripping process continuous because, as one of the adsorbent beds periodically becomes saturated with solvent, it must be taken off-line and regenerated by desorption of the solvent entrained therein. While one bed is being regenerated, the process stream to be stripped of solvent vapors then may be directed through the second bed. Regeneration of saturated beds can be economically achieved by circulation of a heated inert gas stream therethrough to effect vaporization of adsorbed solvent and transportation of the solvent vaporized to a recovery system. An inert gas desorbent is preferred over steam inasmuch as water soluble solvents can be desorbed without an attendant need for subsequent distillations to effect recovery of the solvent from the desorbent. Moreover, the presence of concentrated solvent vapors in the adsorbent bed presents a combustion danger which can be minimized by a blanketing of inert gas.

For the illustrative puprose of this description, valves 60, 62, 64, and 66 are maintained closed while valves 70, 72, 74, and 76 are maintained opened. Process gas stream 58, laden with solvent vapors, is passed via line 80 into adsorbent bed 54. Therein, solvent is adsorbed from the process stream onto a packed adsorbent media, such as activated carbon or the like. Solvent, thusly, is accumulated in bed 54 and solvent vapor-free gas may be exhausted from bed 54 via lines 82 and 84. Turning now to consideration of bed 56 undergoing regeneration, inert gas stream 30, recycled from the solvent recovery process shown generally at 1 and described previously, is introduced into bed 56 via lines 52 and 86 at temperature T7 and pressure P7. In bed 56, the energy carried by stream 30 in the form of heat effects a vaporization of adsorbed solvent, enabling withdrawal by vacuum pump 22 via lines 78 and 26 of adsorbed solvent vapor-laden stream 25 at temperature T1 and pressure P1 and a repetition of the instant inventive process represented in FIG. 1.

While the present invention has been specifically illustrated by reference to FIGS. 1 and 2, instrumentation, controls, feeders, fittings, pumps, and valves necessary for operation are not all shown, but are to be provided where necessary or desirable in conventional fashion. Materials of construction for this process are conventional for this type of operation. Thus, equipment can be composed of or lined with corrosion-resistant materials, alloys or refractory material, depending upon the specific VOC being handled. Piping, duct work and the like will be of similar material and insulated where appropriate. Various of the equipment and lines illustrated can be multiple, series, cascade, or parallel connected for additional treating time capacity, or refinements of separation and/or purification. Regeneration of the adsorbent, for example, is accomplished in conventional fashion.

I claim:

1. A cyclic process for recovering a condensable organic compound from an inert gas stream laden therewith, which comprises the steps of:
   (a) passing said inert gas laden stream in heat exchange relationship with a regenerated gas stream from a later step of the process;
   (b) separating solvent from the heat exchanged gas laden stream of step (a);
   (c) passing the separated gas stream from step (b) through an expander to further cool said separated gas stream;
   (d) separating additional solvent from the expanded stream of step (c) and forming a regenerated gas stream;
   (e) passing said regenerated gas stream to step (a) of the process;
   (f) passing the heat exchanged regenerated gas stream from step (a) of the process through a vacuum pump;
   (g) passing the regenerated gas stream of step (f) into contact with a condensable organic compound for forming said inert gas laden stream passed into step (a) of the process.

2. The method of claim 1 wherein said gas stream of step (f) is passed through a compressor for its heating prior to step (g).

3. The method of claim 2 wherein step (g) comprises passing said gas stream of step (f) into contact with a solid adsorbent containing adsorbed condensable organic compound for forming said inert gas laden stream passed into step (a) of the process.

4. The method of claim 2 wherein said inert gas comprises nitrogen.

5. The method of claim 1 wherein step (g) comprises passing said gas stream of step (f) into contact with a solid adsorbent containing adsorbed condensable organic compound for forming said inert gas laden stream passed into step (a) of the process.

6. The method of claim 1 wherein said inert gas comprises nitrogen.

* * * *